United States Patent [19]

Carlsen et al.

[11] Patent Number: 4,685,773

[45] Date of Patent: Aug. 11, 1987

[54] BIREFRINGENT OPTICAL MULTIPLEXER WITH FLATTENED BANDPASS

[75] Inventors: W. John Carlsen, Boston; Paul Melman, Newton, both of Mass.

[73] Assignee: GTE Laboratories Incorporated, Waltham, Mass.

[21] Appl. No.: 791,820

[22] Filed: Oct. 28, 1985

Related U.S. Application Data

[63] Continuation-in-part of Ser. No. 650,012, Sep. 13, 1984, Pat. No. 4,566,761.

[51] Int. Cl.$^4$ .............................. G02B 5/30; H04J 1/08
[52] U.S. Cl. ........................................ 350/401; 370/2
[58] Field of Search ................... 350/401, 403; 370/2; 455/616

[56] References Cited

U.S. PATENT DOCUMENTS 2,182,142 12/1939 Ball et al. .......................... 350/401
3,532,890 10/1970 Denton ................................... 370/2
3,584,221 6/1971 Furukawa ............................... 370/2

FOREIGN PATENT DOCUMENTS 0157003 12/1979 Japan ..................................... 370/2

OTHER PUBLICATIONS

Shirasaki, M., et al., "Compact Optical Isolator for Fibers Using Birefringent Wedges," *Applied Optics*, vol. 21, No. 23, Dec. 1, 1982, pp. 4296-4299.

Primary Examiner—Bruce Y. Arnold
Attorney, Agent, or Firm—Fred Fisher

[57] ABSTRACT

A birefringent optical wavelength multiplexer/demultiplexer includes a first polarization beam-splitter, a first reflector, a plurality of birefringent elements, a second reflector, and a second polarization beam-splitter. The plurality of birefringent elements are so oriented that each element introduces an additional sinusoidal component to the transfer function of the device that tends to effectuate a flattened transfer function.

7 Claims, 5 Drawing Figures

M: MIRROR
PBS: POLARIZATION BEAM SPLITTER
$C_n$: nth CRYSTAL

M: MIRROR
PBS: POLARIZATION BEAM SPLITTER
$C_n$: nth CRYSTAL

TIR: TOTAL INTERNAL REFLECTION SURFACE
PBS: POLARIZATION BEAM SPLITTER
$C_n$: nth BIREFRINGENT PLATE

BIREFRINGENT OPTICAL MULTIPLEXER WITH FLATTENED BANDPASS

CROSS-REFERENCE TO RELATED APPLICATION

This application is a continuation-in-part of U.S. patent application, Ser. No. 650,012 now U.S. Pat. No. 566,761, filed Sept. 13, 1984 entitled "Birefringent Optical Wavelength Multiplexer/Demultiplexer", by inventors W. John Carlsen and Paul Melman, the applicants of this instant continuation-in-part application.

The subject matter of the foregoing parent application is incorporated herein by reference.

BACKGROUND OF THE INVENTION

1. Field of the Invention

This invention relates to birefringent optical multiplexers having a flattened bandpass. Accordingly, it is a general object of this invention to provide new and improved multiplexers of such character.

2. General Background

Wavelength-Division Multiplexing (WDM) can be used to combine two or more optical wavelength carriers in a single optical path, in such a manner that they can be completely separated (de-multiplexed) subsequently with their respective data contents intact. Some WDM designs, including this instant invention, can be used for optical duplexing to provide two sets of signals for propagation in opposite directions through the same fiber.

An advantage of Wavelength-Division Multiplexing is that the total data capacity of a system can be multiplied by a factor of two or more beyond the limitations imposed by the speed of the electronics or the dispersion of an optical fiber, since each channel of a wavelength-division multiplexing system can be modulated at full capacity without affecting other channels in the same fiber.

Our parent application describes the relationship of our basic birefringent multiplexer system to previous designs. In brief, the known prior art optical multiplexer designs use either diffraction gratings or dichroic filters as the basic means of combining and/or separating various wavelength channels.

Our design as set forth in the parent application, in contrast, utilizes birefringent optical filtering in combination with a polarization insensitivity feature and the ability to tune the passband over a very wide range.

Disadvantageously, currently known available WDM components, utilizing dichroic filters or gratings, are severely limited by very wide channel spacing, much wider than the very small range over which fiber dispersion is insignificantly small. Thus, optimal use of the fiber's high bandwidth capability can only be achieved on one of the channels. Attempts to achieve closer spacings have resulted in higher temperature sensitivity, higher losses, difficult mechanical tolerances, and low yields for complex coating designs.

SUMMARY OF THE INVENTION

Another object of this invention is to provide a new and improved birefringent optical multiplexer that provides a bandpass characteristic, as a function of optical wavelength, that is flattened in the vicinity of the nominal wavelength of each channel, thus increasing its tolerance to inaccurate laser wavelengths, multiple longitudinal laser modes, and temperature effects of both laser and multiplexer.

In accordance with one aspect of the invention, a birefringent optical wavelength multiplexer/demultiplexer includes beam splitting means, reflecting means and a plurality of birefringent elements. A first polarization beam splitting means splits an applied collimated beam of light into a first pair of linearly polarized beams whose directions of propagation are perpendicular to each other. A first reflecting means reflects one of the linearly polarized beams parallel to the other polarized beam. A plurality of birefringent elements are provided wherein each element has a pair of opposed surfaces, one of the surfaces of an element being parallel to and in adjacent relationship with another of the elements. Each element has respective optical axes oriented nominally parallel to the surfaces of the respective element. The elements are oriented with the parallel surfaces perpendicular to the direction of propagation of the linearly polarized beams. The respective optical axes are oriented at specific angles with respect to the first polarization beam splitting means. One electric field component of each of the two beams incident upon an element is parallel to the extraordinary axis of that element and propagates at a different velocity, dependent upon the material of the element, from the other electric field component which is parallel to the ordinary axis of that element. The plurality of birefringent elements are so oriented that each element introduces an additional sinusoidal component to the transfer function of the device, tending to effectuate a flattened transfer function. A second reflecting means reflects the other polarized beam, following propagation of the other beam through the elements, in a direction perpendicular to that of the one polarized beam following propagation of the one polarization beam through the elements. A second polarized beam splitting means is oriented to receive both the reflected other beam and the propagated one beam. Thus, (1) when the propagated other beam and the propagated one beam have polarization states which are linearly polarized parallel to the polarization directions of the respective first pair of polarized beams, the reflected other beam is transmitted by the second polarization beam splitting means. The propagated one beam is reflected by the second polarization beam splitting means, whereby the reflected other beam and the propagated one beam are combined and transmitted outwardly from a first port; and (2) when the propagated other beam and the propagated one beam have polarization states which are linearly polarized perpendicular to the polarization directions of the respective first pair of polarized beams, the reflected other beam is applied by the second polarization beam splitting means, and the propagated one beam is transmitted by the second polarization beam splitting means, whereby the reflected other beam and the propagated one beam are combined and transmitted outwardly from a second port. In accordance with a feature of the invention, the multiplexer/demultiplexer could be uniformly varied in temperature so as to affect both the optical lengths and birefringence of the crystals.

In accordance with another aspect of the invention, a birefringent optical wavelength multiplexer/demultiplexer includes a first polarization beam splitting means for splitting an applied collimated beam of light into a first pair of linearly polarized beams whose directions of propagation are at an angle with one another. A first reflecting means reflects one of the linearly polarized beams parallel to the other. A plurality of birefringent elements are provided wherein each element has a pair of opposed surfaces, one of the surfaces of one of the elements being parallel to and in adjacent relationship with another of the elements. Each of the elements has a respective optical axis oriented nominally parallel to the surfaces of the respective element. The elements are oriented with the parallel surfaces perpendicular to the direction of propagation of the linearly polarized beams. The respective optical axis is oriented at a specific angle with respect to the first polarization beam splitting means. One electric field component of each of the two beams incident upon an element is parallel to the "extraordinary" axis of that element, and propagates at a different velocity, depending upon the material of the element, from the other electric field component which is parallel to the "ordinary" axis of that element. This may result in a changed polarization state for both beams. A second reflecting means reflects the other of the linearly polarized beams following propagation of the other beam through the elements, in the direction parallel to that of the one of the polarized beams following propagation of the one polarized beam through the elements. A second polarized beam splitting means is oriented to receive both the reflected other beam and the propagated one beam. Thus (1) when the propagated other beam and the propagated one beam have polarization states which are linearly polarized parallel to the polarization directions of the respective first pair of polarized beams, the reflected other beam is transmitted by the second polarization beam splitting means, and the propagated one beam is reflected by the second polarization beam splitting means, whereby the reflected other beam and the propagated one beam are combined and transmitted outwardly from a first port; and (2) when the propagated other beam and the propagated one beam have propagation states which are linearly polarized perpendicular to the polarization directions of the respective first pair of polarized beams, the reflected other beam is reflected by the second polarization beam splitting means, and the propagated one beam is transmitted by the second polarization beam splitting means, whereby the reflected other beam and the reflected one beam are combined and transmitted outwardly from a second port. In accordance with a feature of the invention, the multiplexer/demultiplexer could be uniformly varied in temperature so as to affect both the optical lengths and birefringence of the crystals.

In accordance with still another aspect of the invention, a mechanically tunable optical wavelength multiplexer includes a comb filter unit having a plurality of birefringent elements. Each element has a pair of parallel opposite sides, one of the sides of one of the elements being parallel to and in adjacent relationship with another of the elements. The plurality of birefringent elements is so oriented that each element introduces an additional sinusoidal component to the transfer function of the device, tending to effectuate a flattened transfer function. The comb filter unit further comprises a first polarization beam splitter for splitting a collimated beam of light, at a wavelength $\lambda$, into a first pair of linearly polarized beams whose directions of propagations are at an angle to one another. A first reflecting surface is provided for reflecting one of the polarized beams along a path parallel to the other of the polarized beams. Both the other polarized beam and the reflected beam are incident upon one of the parallel sides of the elements for transmission through all the elements. A second reflecting surface reflects the other of the polarized beams following its transmission through all of the elements. A second polarization beam splitter is provided for combining the reflected other beam and the reflected one beam and transmitting the combined light through one of two ports. At least one of the birefringent elements includes a pair of wedges of birefringent material so arranged that moving one of the wedges relative to the other changes the effective thickness of the material through which the light propagates, and, thus, varies the overall retardation, thereby providing a continuous change in both the wavelength $\lambda$ and in channel spacing $\Delta \lambda$, so that in a 2-channel system, the unit can be tuned precisely to the wavelengths of two signals to be multiplexed.

BRIEF DESCRIPTION OF THE DRAWINGS

Other objects, advantages and features of this invention, together with its construction and mode of operation, will become more apparent from the following description, when read in conjunction with the accompanying drawings, in which.

DESCRIPTION OF PREFERRED EMBODIMENTS

The following description is directed to a bandpass flattened version of the tunable 2-channel multiplexer/demultiplexer described in our parent application. Extensions of our teachings to 4-channel multiplexers/demultiplexers and to even greater numbers of channels will become apparent.

Figure 1A:
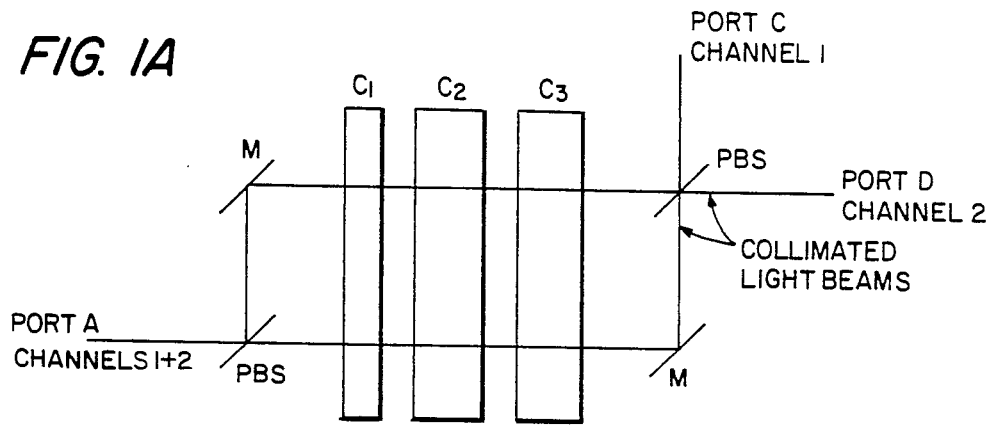
FIGS. 1A and 1B are schematic optical diagrams of two alternative constructions of a birefringent optical multiplexer with flattened bandpass, in accordance with various embodiments of this invention.
Figure 1B:
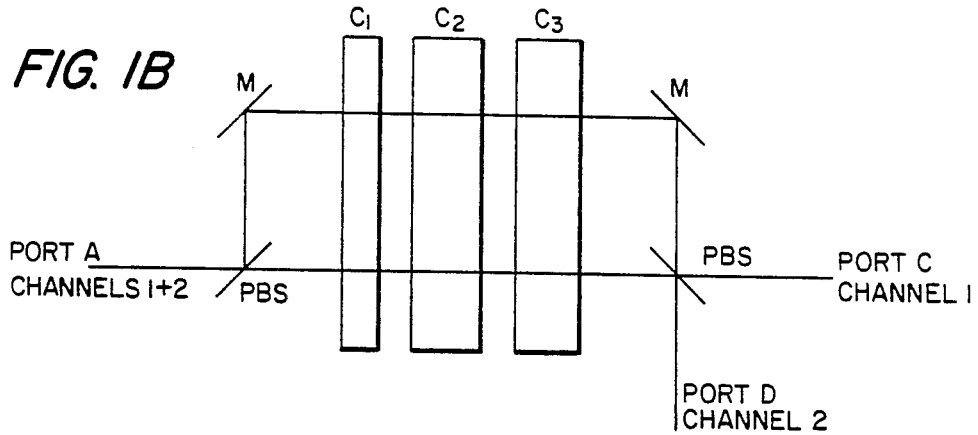
Figure 2:
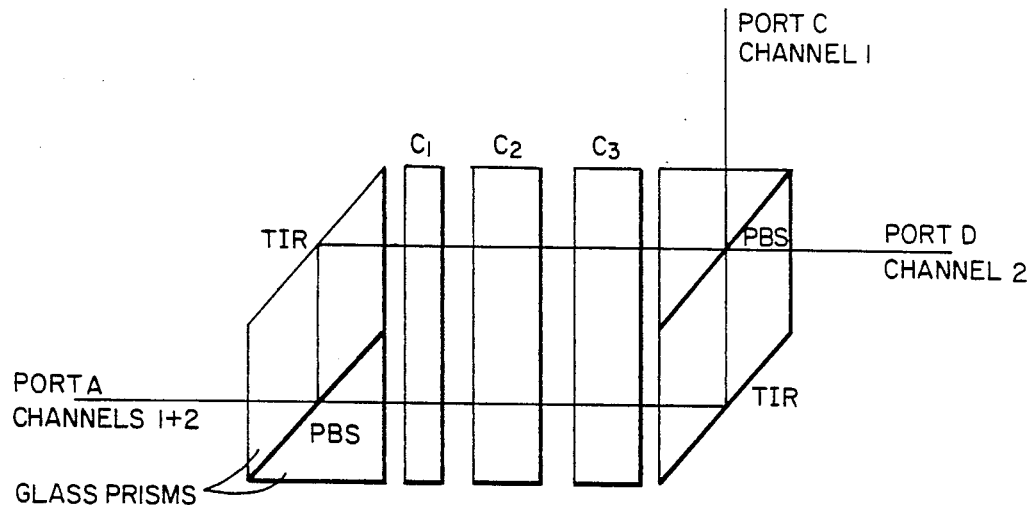
FIG. 2 is a diagram of a practical implementation of a multiplexer/demultiplexer in accordance with an embodiment of this invention.

FIGS. 1A and 1B are schematic optical diagrams of improved 2-channel versions of our multiplexers/demultiplexers, and FIG. 2 is a diagram of a practical implementation of such versions. The principal difference over our original design set forth in our parent application is the provision of a plurality of birefringent crystal prisms or plates (three are shown in the drawing as a non-limiting specific example) in series in an optical path.

Figure 3:
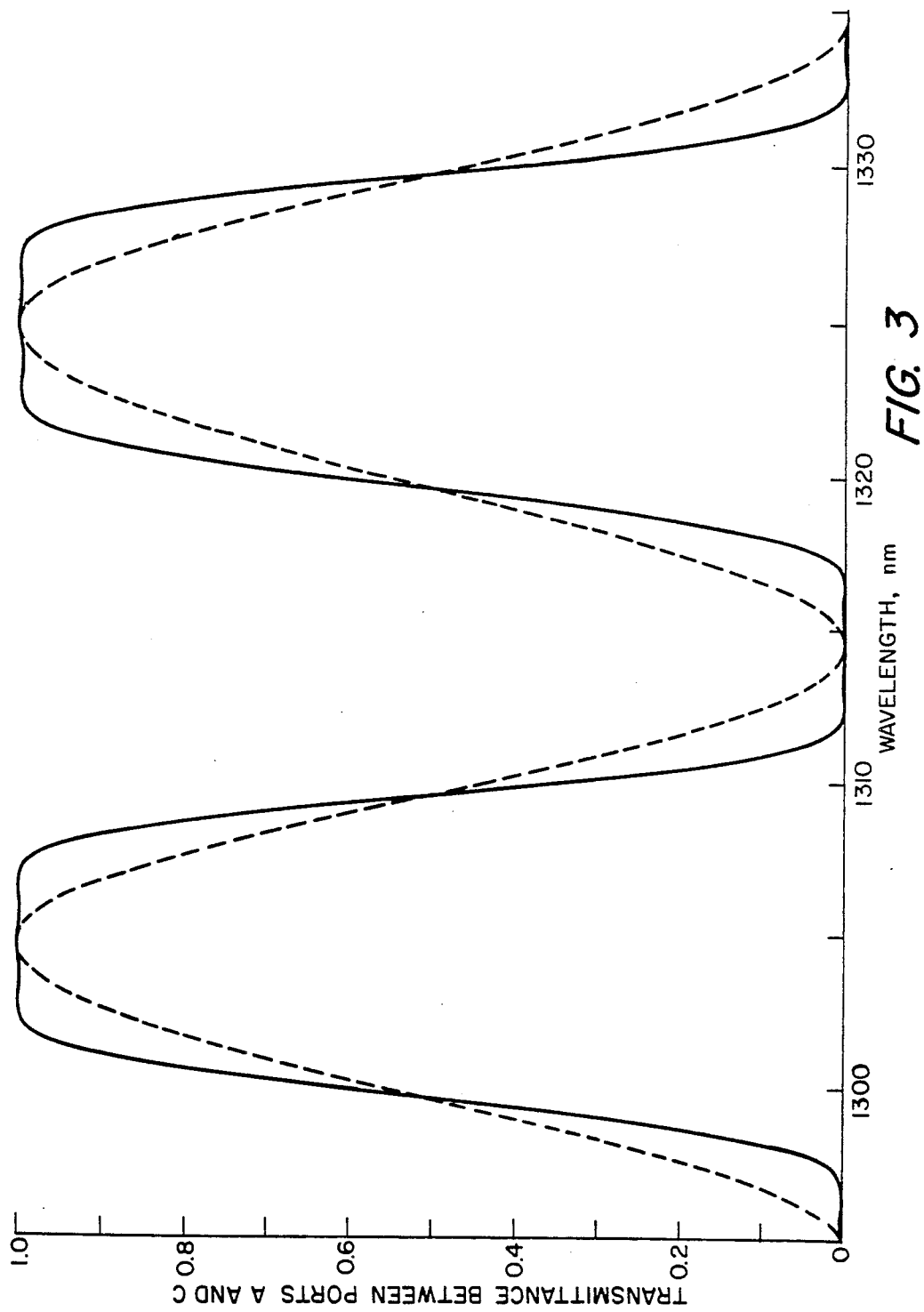
FIG. 3 is a typical multi-plate transfer function (intensity transmittance vs. wavelength) utilizing the teachings of the instant invention, together with the corresponding single-plate design set forth in our parent application.

The provision of a single crystal, or a single birefringent element, provides a bandpass which is sinusoidal, as indicated in dashed outline in FIG. 3, as a function of optical frequency for each output channel. The bandpass function for a 3-crystal multiplexer is illustrated in solid outline.

FIG. 2, which depicts a practical implementation of a multiplexer/demultiplexer in accordance with this invention, illustrates three crystals 11, 12, 13 that are each cut and oriented similar to the single crystal version described in our aforecited parent application. Each of the three crystals 11, 12, 13 has parallel planar surfaces through which light beams enter and exit at normal incidence. Their crystal optical axes are parallel to these surfaces, but not, in general, to one another. Their thicknesses are also not necessarily equal, though they could be. The transfer function of such a device is, in general, not sinusoidal.

Methods of determining the spectral characteristics for such a series of birefringent plates have been described in the literature, predominantly for the synthesis of very narrow bandpass optical filters, such as set forth in a publication by Eugene 0. Ammann, "Synthesis of Optical Birefringent Networks", Progress in Optics, Vol. XI, 1971, pp. 123-177.

In general, by adding more birefringent plates and orienting them at different angles, additional sinusoidal components are introduced to the transmittance transfer function. The Fourier "frequency" of each component is determined by the thickness and birefringence of the crystals, and the relative amplitudes of the components are determined by the relative angles of their crystal optical axes.

The bandpass requirements for wavelength-division multiplexers differ from narrow bandpass filters. Rather than aiming for the narrowest practical bandpass, each wavelength channel should be as wide and as flat as possible. For most WDM applications, a "square wave" transfer function would be the ideal shape. A good approximation to this shape can be obtained by using crystals which effectively synthesize the first two or three odd harmonic components of a Fourier series representation of a square wave. The angles can be adjusted to maximize the flatness of the transfer function at the top and bottom of the square-wave approximation.

For some applications, mechanical tuning might adversely affect cost and/or ruggedness. Another alternative approach would be to package the multiplexer such that it can be uniformly varied in *temperature*. The device could be cemented into a single unit. Temperature affects both the optical lengths and the birefringence of the crystals, and the channel spacing is a direct function of the product of these two properties. This is true for single or multiple crystal designs, as long as the crystal materials are the same or have the same temperature coefficients.

Temperature tuning becomes more advantageous as channels become closer together, and as more crystals are added to achieve better passband characteristics. With more crystals, adjusting them mechanically becomes more complicated and expensive. For closely spaced channels, normal ambient temperature changes may detune a multiplexer, and temperature control may be needed anyway. Tuning capability is then an inexpensive extension of the control circuitry.

FIG. 3, as stated earlier, shows a typical multiplate transfer function suitable for most WDM applications. The multiplexer having such a transfer function permits the laser spectrum to be much wider, to drift further, and to be slightly inaccurate at the nominal channel center wavelength, than the sinusoidal function, and is less sensitive to temperature changes which tend to cause the bandpass to slightly shift.

The bandpass for this series of birefringent plates is identical for any two mutually orthogonal polarization states. Thus, the teaching set forth in our parent application for providing insensitivity to the polarization state and to changes of polarization can also be used in this more complex design. That technique involves separating the input beam into two mutually perpendicular linearly polarized beams, and passing them through the crystal plate(s) along parallel but separate paths. When the beams are recombined using an identical polarization beam splitter, they both exit from either output port with the same transfer function, independent of the original polarization state.

As in the original invention set forth in our aforecited parent application, the ability to tune the passband to the wavelengths of the supplied lasers is highly desirable. It is not as critical in this instant design as in our parent application, however, since rather large wavelength mismatches are now permissable between the laser wavelengths and the central channel wavelengths of the multiplexer. Thus, for some applications, it is now much more practical to use nonadjustable multiplexers. In that case, the various crystal plates and beam splitting prisms shown in FIG. 2 can be optimally aligned and then mechanically attached to one another with an optical adhesive to produce a more rugged and stable device with reduced reflection losses. A variation of this approach would be to provide multiplexer units with removable crystal sections, so that the user could insert specific modules of one or more crystal plates appropriate to the application.

Figure 4:
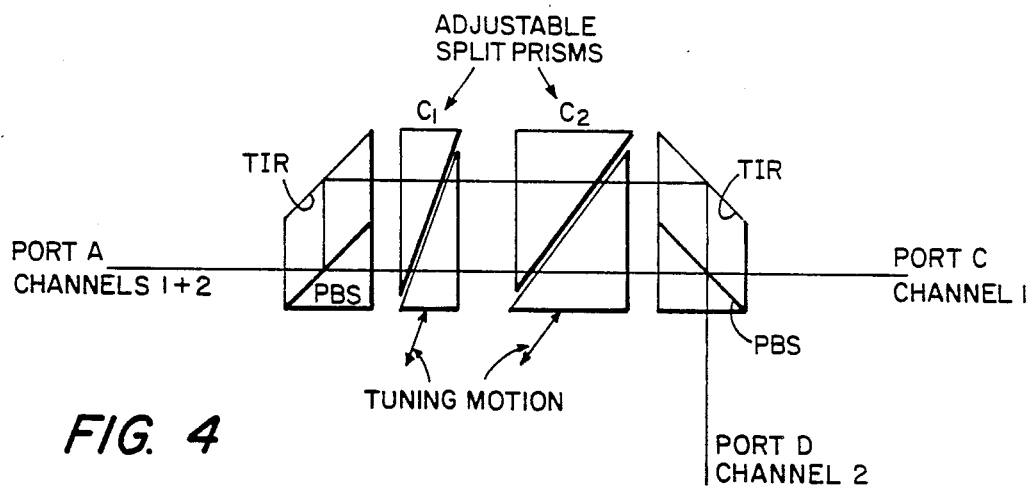
FIG. 4 is a block diagram of a tunable two-crystal multiplexer/demultiplexer having flattened bandpass characteristics in accordance with the teachings of this invention.

If tunability is desired, the techniques described in our parent application may be used. Now, however, it is desirable to tune each of the prisms together at different rates. For example, referring to FIG. 4, the 2-crystal multiplexer has a plurality of prisms, wherein each prism is made adjustable in effective thickness by moving one of its diagonally-cut parts relative to the other. Since the thickness of each must be varied at a rate proportional to its thickness, the angle of the cut could be different on each, as shown, and a single mechanical movement could adjust them both in proper synchronization.

Our parent application sets forth how the natural periodic nature of the transfer function of the birefringent multiplexer makes it especially easy to combine several multiplexer units for the multiplexing and demultiplexing of more than two channels. The same configurations can be used with this new bandpass flattened design, with even greater advantages. Techniques of the prior art for tuning the multiplexer to more than two lasers with non-uniformly spaced wavelengths are difficult. The flattened bandpass characteristics of the multi-plate devices described herein considerably reduce the required tolerances to which the lasers must be selected for wavelength and thus makes multi-channel WDM systems much easier and less costly to implement than related devices of the prior art.

Advantageous features of this invention include the provision of a multiplexer with a reduced sensitivity to laser spectral characteristics and temperature detuning. With our invention, achieving arbitrarily close channel spacing does not require re-design of any coatings or any material changes. Only the crystal plate thicknesses need be changed, and the relative bandpass shape remains unchanged. Our invention further provides for automatic polarization insensitivity for all wavelength channels, independent of bandpass design. Bandpass is periodic for a wide range of bandpass shapes, making multi-wavelength WDM systems easier to design, with a combination of 2-channel units arranged in a tree configuration.

What is claimed is:

1. A birefringent optical wavelength multiplexer/demultiplexer comprising first polarization beam splitting means for splitting an applied collimated beam of light into a first pair of linearly polarized beams whose directions of propagation are perpendicular to one another;

first reflecting means for reflecting one of said linearly polarized beams parallel to the other polarized beam;

a plurality of birefringent elements, each said element having a pair of opposed surfaces, one of said surfaces of one of said elements being parallel to and in adjacent relationship with another of said elements, each of said elements having a respective optical axis oriented nominally parallel to said surfaces of the respective element, said elements being oriented with said parallel surfaces perpendicular to the direction of propagation of said linearly polarized beams, said respective optical axis being oriented at specific angles with respect to said first polarization beam splitting means, one electric field component of each of the two beams incident upon an element being parallel to the "extraordinary" axis of that element and propagating at different velocity, dependent upon the material of that element, from the other electric field component which is parallel to the "ordinary" axis of that element;

said plurality of birefringent elements being so oriented that each element introduces an additional sinusoidal component to the transfer function of the device, tending to effectuate a flattened transfer function;

second reflecting means for reflecting the other of said linearly polarized beams, following propagation of said other beam through said elements, in a direction perpendicular to that of said one of said polarized beams following propagation of said one polarized beam through said elements; and second polarization beam splitting means oriented to receive both said reflected other beam and the propagated one beam, wherein (1) when the propagated other beam and the propagated one beam have polarization states which are linearly polarized parallel to the polarization directions of said respective first pair of polarized beams, said reflected other beam is transmitted by said second polarization beam splitting means, and said propagated one beam is reflected by said second polarization beam splitting means, whereby said reflected other beam and said propagated one beam are combined and transmitted outwardly from a first port; and (2) when the propagated other beam and the propagated one beam have polarization states which are linearly polarized perpendicular to the polarization directions of said respective first pair of polarized beams, said reflected other beam is reflected by said second polarization beam splitting means, and said propagated one beam is transmitted by said second polarization beam splitting means, whereby said reflected other beam and said propagated one beam are combined and transmitted outwardly from a second port.

2. The multiplexer/demultiplexer as recited in claim 1 further comprising means for uniformly varying the temperature of said birefringent elements.

3. A birefringent optical wavelength multiplexer/demultiplexer comprising first polarization beam splitting means for splitting an applied collimated beam of light into a first pair of linearly polarized beams whose directions of propagation are at an angle with one another;

first reflecting means for reflecting one of said linearly polarized beams parallel to the other polarized beam;

a plurality of birefringent elements, each said element having a pair of opposed surfaces, one of said surfaces of one of said elements being parallel to and in adjacent relationship with another of said elements, each of said elements having a responsive optical axis oriented nominally parallel to said surfaces of the respective element, said elements being oriented with said parallel surfaces perpendicular to the direction of propagation of said linearly polarized beams, each said respective optical axis being oriented at a specific angle with respect to the first polarization beam splitting means, one electric field component of each of the two beams incident upon an element being parallel to the "extraordinary" axis of that element and propagating at different velocity, dependent upon the material of that element, from the other electric field component which is parallel to the "ordinary" axis of that element;

said plurality of birefringent elements being so oriented that each said element introduces an additional sinusoidal component to the transfer function of the device tending to effectuate a flattened transfer function;

second reflecting means for reflecting the other of said polarized beams, following propagation of said other beam through said elements, in a direction perpendicular to that of said one of said polarized beams following propagation of said one polarized beam through said elements; and second polarization beam splitting means oriented to receive both said reflected other beam and the propagated one beam, wherein (1) when the propagated other beam and the propagated one beam have polarization states which are linearly polarized parallel to the polarization directions of said respective first pair of polarized beams, said reflected other beam is transmitted by said second polarization beam splitting means, and said propagated one beam is reflected by said second polarization beam splitting means, whereby said reflected other beam and said propagated one beam are combined and transmitted outwardly from a first port; and (2) when the propagated other beam and the propagated one beam have polarization states which are linearly polarized perpendicular to the polarization directions of said respective first pair of polarized beams, said reflected other beam is reflected by said second polarization beam splitting means, and said propagated one beam is transmitted by said second polarization beam splitting means, whereby said reflected other beam and said propagated one beam are combined and transmitted outwardly from a second port.

4. The multiplexer/demultiplexer as recited in claim 3 further comprising means for uniformly varying the temperature of said birefringent elements.

5. A birefringent optical wavelength multiplexer/demultiplexer comprising first polarization beam splitting means for splitting a first applied collimated beam of light into a first pair of linearly polarized beams whose directions of propagation are perpendicular to one another, and for splitting a second applied collimated beam of light into a second pair of linearly polarized beams whose directions of propagations are perpendicular, one polarized beam from said first collimated beam being directed along a first common path as one polarized beam of said second collimated beam, and the other polarized beam from said first collimated beam being directed along a second common path as the other polarized beam of said second collimated beam;

first reflecting means for reflecting said one polarized beams of said both collimated beams to a third path parallel to said second common path;

a plurality of birefringent elements, each said element having a pair of opposed parallel surfaces, with a respective optical axis oriented nominally parallel to said surfaces of the respective element, said elements being oriented with said parallel surfaces perpendicular to said third path and said second common path, each said respective optical axis being oriented at specific angles with respect to said first polarization beam splitting means, those components of those polarized beams incident upon an element being parallel to the "extraordinary" axis of that element and propagating at different velocity, dependent upon the material of said element, from the other polarized components which are parallel to the "ordinary" axis of that element;

said plurality of birefringent elements being so oriented that each element introduces an additional sinusoidal component to the transfer function of the device tending to effectuate a flattened transfer function;

second reflecting means for reflecting said other polarized beams that have traversed said second common path to a direction perpendicular to said third path; and second polarization beam splitting means oriented to receive the one polarized beams from both collimated beams that have traversed said third path, and said other polarized beams from both collimated beams that have traversed said second common path, wherein (1) when both polarized beams from said first collimated beam combine to yield a polarization state which is linearly polarized parallel to the polarization directions of said first applied collimated beam, the reflected other beam of said first collimated beam is transmitted by said second polarization beam splitting means, and said propagated one beam of said first applied collimated beam is reflected by said second polarization beam splitting means, whereby said reflected other beam and said propagated one beam of said first collimated beam are combined and transmitted outwardly from a first port;

(2) when both polarized beams from said second collimated beam combine to yield a polarization state which is linearly polarized perpendicular to the polarization directions of said second applied collimated beam, the reflected other beam of said second collimated beam is transmitted by said second polarization beam splitting means, and said propagated one beam of said second collimated beam is reflected by said second polarization beam splitting means, whereby said reflected other beam and said propagated one beam of said second collimated beam are combined and transmitted outwardly from said first port;

(3) when both polarized beams from said first collimated beam combine to yield a polarization state which is linearly polarized perpendicular to said first applied collimated beam, the reflected other beam of said first collimated beam is reflected by said second polarization beam splitting means, and said propagated one beam of said first applied collimated beam is transmitted by said second polarization beam splitting means, whereby said reflected other beam and said propagated one beam of said first collimated beam are combined and transmitted outwardly from a second port; and (4) when both polarized beams from said second collimated beam combine to yield a polarization state which is linearly polarized parallel to said second applied collimated beam, the reflected other beam of said second collimated beam is reflected by said second polarization beam splitting means, and said propagated one beam of said second collimated beam is transmitted by said second polarization beam splitting means, whereby said reflected other beam and said propagated one beam of said second collimated beam are combined and transmitted outwardly from said second port.

6. A comb filter unit comprising a plurality of birefringent elements, each said element having a pair of parallel opposite sides, one of said sides of one of said elements being parallel to and in adjacent relationship with another of said elements, said plurality of birefringent elements being so oriented that each element introduces an additional sinusoidal component tending to effectuate a flattened transfer function;

a first polarization beam splitter for splitting a collimated beam of light into two linearly polarized beams whose directions of propagations are at an angle to one another, a first reflecting surface for reflecting one of said polarized beams along a path parallel to the other of said polarized beams, both said other polarized beam and said reflected beam being incident upon one of said parallel sides of one of said elements, for transmission through all of said elements, a second reflecting surface for reflecting the other of said polarized beams following its transmission through all of said elements, and a second polarization beam splitter for combining said reflected other beam and said reflected one beam and transmitting the combined light through one of two ports.

7. A mechanically tunable optical wavelength multiplexer including a comb filter unit comprising a plurality of birefringent elements, each said element being a pair of parallel opposite sides, one of said sides of one of said elements being parallel to and in adjacent relationship with another of said elements, said plurality of birefringent elements being so oriented that each element introduces an additional sinusoidal component tending to effectuate a flatened transfer function;

a first polarization beam splitter for splitting a collimated beam of light at a wavelength $\lambda$ into two linearly polarized beams whose directions of propagations are at an angle to one another, a first reflecting surface for reflecting one of said polarized beams along a path parallel to the other of said polarized beams, both said other polarized beam and said reflected beam being incident upon one of said parallel sides of said elements for transmission through all said elements, a second reflecting surface for reflecting the other of said polarized beams following its transmission through all of said elements, and a second polarization beam splitter for combining said reflected other beam and said reflected one beam and transmitting the combined light through one of two ports, at least one of said birefringent elements including a pair of wedges of birefringent material, arranged such that moving one relative to the other changes the effective thickness of the material through which the light propagates, and thus varies the overall retardation whereby, a continuous change in both said wavelength $\lambda$ and in channel spacing $\Delta\lambda$ is provided, so that in a 2-channel system, said unit can be tuned precisely to the wavelengths of two signals to be multiplexed.

* * * * *